United States Patent [19]

Dale et al.

[11] Patent Number: 4,527,909
[45] Date of Patent: Jul. 9, 1985

[54] SEALED TEMPERATURE PROBE

[75] Inventors: Steven M. Dale, Williamsville; Richard C. Paluch, Blasdell; Gerald A. Setter, Jr., Depew, all of N.Y.

[73] Assignee: Conax Corporation, Buffalo, N.Y.

[21] Appl. No.: 535,166

[22] Filed: Sep. 23, 1983

[51] Int. Cl.³ .......................... G01K 7/00; G01K 1/08
[52] U.S. Cl. .................................. 374/163; 136/230; 374/179; 374/183; 374/208
[58] Field of Search ............... 374/208, 183, 163; 136/230

[56] References Cited

U.S. PATENT DOCUMENTS

| | | | |
|---|---|---|---|
| 2,838,935 | 6/1958 | Di Cecio et al. | 374/208 X |
| 3,040,579 | 6/1962 | Taylor | 374/179 X |
| 3,151,484 | 10/1964 | Feehan et al. | 374/179 X |
| 3,535,165 | 10/1970 | Webb | 136/233 X |
| 3,966,500 | 6/1976 | Brixy | 374/163 X |
| 3,996,071 | 12/1976 | Klicks et al. | 374/163 X |
| 4,018,624 | 4/1977 | Rizzolo | 136/232 X |
| 4,234,197 | 11/1980 | Amancharla et al. | 277/DIG. 6 |
| 4,453,835 | 6/1984 | Clawson et al. | 374/185 |

*Primary Examiner*—Daniel M. Yasich
*Attorney, Agent, or Firm*—Sommer & Sommer

[57] ABSTRACT

A temperature probe has a metal casing, closed at one end and open at its other, in which a temperature sensor is buried in compacted hygroscopic mineral insulation having an exposed end face through which extend wires from the sensor. Such end face is sealed to keep it dry by a metal tube having one end surrounding and brazed to the metal casing, and plugged at its other end by a body of compressed sealant material. Lead wires extend through the sealant body and are electrically joined in a space provided between the exposed end face of mineral insulation and the opposing inner end face of the sealant plug.

6 Claims, 9 Drawing Figures

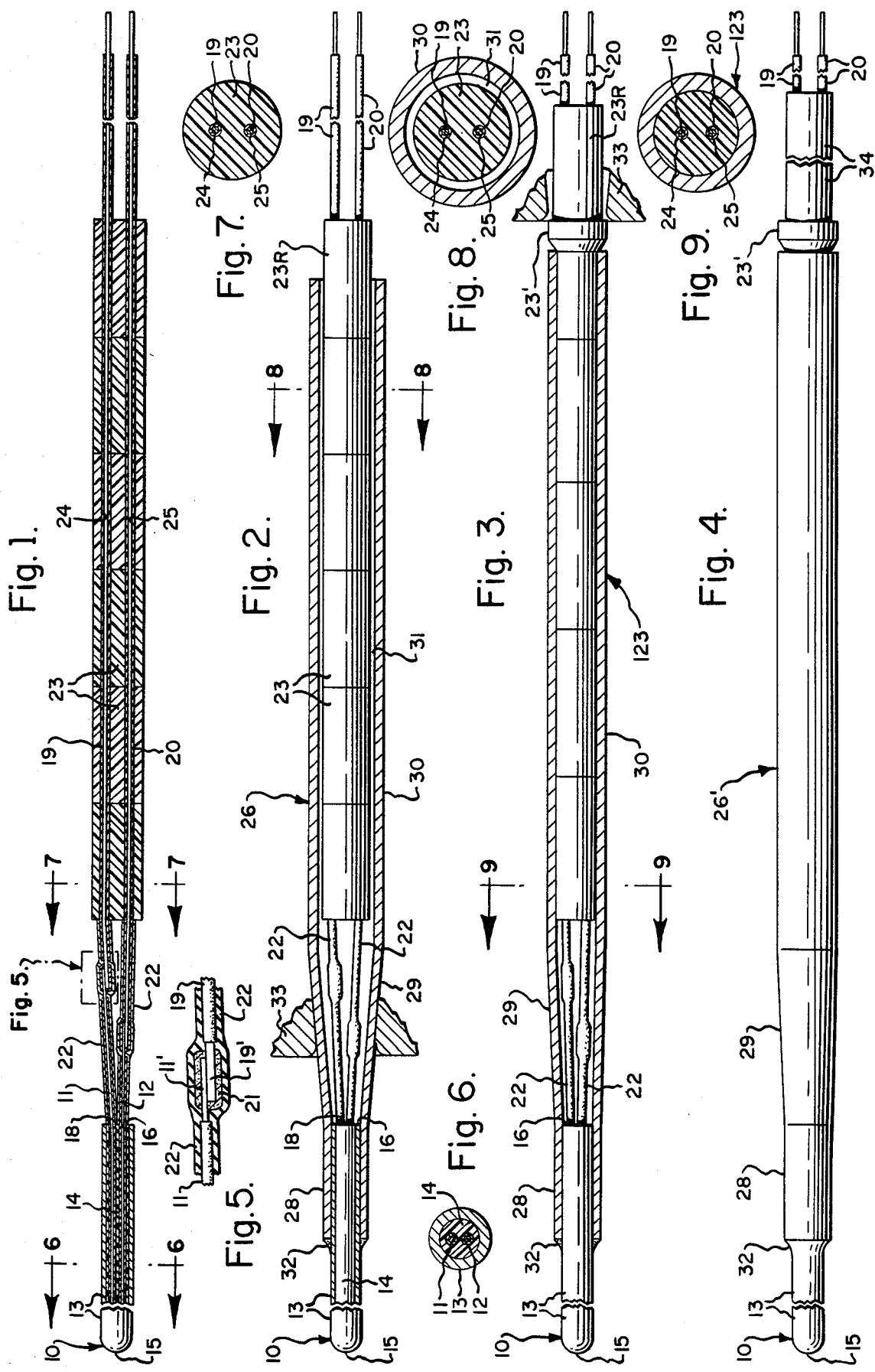

SEALED TEMPERATURE PROBE

This invention relates to temperature probes, and more particularly to one which includes a mineral insulated temperature sensor or transducer and means for sealing the end of the mineral insulation.

Mineral insulated temperature sensors or transducers are well known. One type is a thermocouple comprising two wires of different metals having a junction buried in a body of compacted mineral insulation, enclosed is a protective tubing or casing. The protected junction is subjected to heat in use and the wires extending therefrom are connected to an electrical circuit which by measuring the thermoelectric current produced at such junction indicates the temperature at that point.

Another type is a resistance temperature device comprising a length of platinum wire, the resistance of which varies by heat, also buried in a body of compacted mineral insulation enclosed in a protective tube or housing, from which lead wires extend for connection to a suitable resistant-measuring bridge.

With both such types of temperature sensors, the mineral insulation employed is usually compacted magnesium oxide, selected because of its high insulation properties. However, magnesium oxide is hygroscopic and therefore must be kept dry in order to protect the integrity of the temperature sensor. With both mentioned types of temperature sensors, the body of magnesium oxide terminates in an end face from which wires extend outwardly and through which end face moisture can enter unless sealed.

The present invention is concerned with means for sealing the moisture-sensitive end face of the temperature sensor. Many attempts to effectively seal such temperature sensors have been made prior to the advent of the present invention which have not been fully successful or satisfactory.

Accordingly, the primary object of the present invention is to provide a temperature probe in which a mineral insulated temperature sensor is effectively sealed to keep the end face of the mineral insulation dry.

Another object is to provide such a temperature probe which can be easily mounted on a supporting structure.

A further object is to provide such a temperature probe which is relatively easy and inexpensive to manufacture.

SUMMARY OF THE INVENTION

The present invention provides a temperature probe comprising temperature sensing means including wires, a metal casing and a body of mineral insulation surrounding said wires and compressed thereagainst by said casing, said wires extending outwardly beyond the end of said body, means for sealing such outer end of said body of mineral insulation including a metal tubular housing, means for sealingly connecting said housing at one end to said casing, a body of sealant material transversely filling said housing at its other end and having an inner end spaced from said outer end of said mineral insulation body to leave a space therebetween and lead wires extending through said body of sealant material and therebeyond at both ends, said lead wires being in spaced relation to one another and to said housing, said body of sealant material being compressed by said housing against said lead wires, and means within said space electrically joining said lead wires to said sensor wires.

The foregoing objects and other advantages will become apparent from the following detailed description of a preferred embodiment of the invention shown in the accompanying drawing in which:

FIG. 1 is a longitudinal sectional view of a temperature sensor having wires connected to lead wires extending through bodies of sealant material, and representing an intermediate subassembly of elements preparatory to providing a seal for the exposed end of the mineral insulation in the temperature sensor.

FIG. 2 is a longitudinal view of the subassembly shown in FIG. 1, and additionally showing in longitudinal section a metal tubular housing surrounding at one end the casing of the sensor and at its other end surrounding the sealant bodies, this view representing another subassembly prior to swaging of the metal housing.

FIG. 3 is a view similar to FIG. 2 but showing the condition of the sealant bodies and the metal housing following swaging.

FIG. 4 is a side elevational view of the inventive temperature probe fully assembled.

FIG. 5 is a fragmentary enlarged portion of FIG. 1 and showing the illustrated means for electrically joining a lead wire to a sensor wire.

FIG. 6 is an enlarged transverse sectional view of the mineral insulated temperature sensor shown in FIG. 1 and taken on line 6—6 thereof.

FIG. 7 is an enlarged transverse sectional view of the subassembly shown in FIG. 1 and taken on line 7—7 thereof.

FIG. 8 is an enlarged transverse sectional view of the subassembly shown in FIG. 2 prior to swaging and taken on line 8—8 thereof.

FIG. 9 is an enlarged transverse sectional view of the swaged assembly shown in FIG. 3 and taken on line 9—9 thereof.

DESCRIPTION OF THE PREFERRED EMBODIMENT

The numeral 10 represents generally temperature sensing means including wires 11 and 12, a metal casing 13, and a body of mineral insulation 14 surrounding wires 11,12 and compressed thereagainst by casing 13. This casing is a length of tubing, preferably made of stainless steel, shown as having a closed left end 15 and an open right end 16. Insulating body 14 is shown as filling casing 13, maintaining sensor wires 11,12 in spaced relation and in spaced relation to the casing, and terminating in an exposed end face 18 substantially flush with casing end 16. Insulating body 14 is preferably magnesium oxide and is compacted within casing 13 by a drawing or swaging operation performed on this casing, as is well known in the art.

Temperature sensor 10 may be a thermocouple type or a resistance temperature device type, both of which are well known in the art. Illustrated for simplicity is the thermocouple type since it only has two sensor wires 11,12. In the case of a resistance temperature device, there would be three or four sensor wires.

It is the principal purpose of the present invention to effectively seal off the exposed end face 18 of the mineral insulation, while permitting electrical connection to be made to sensor wires 11,12. To this end, a pair of heavier lead wires 19 and 20 of the desired length are provided for sensor wires 11 and 12, respectively. The wire materials are matched so that corresponding wire pair 11 and 19 are the same material, and the other wire pair 12 and 20 are of the same material. These materials will be of dissimilar metals, such as copper and constantan, in the case of a thermocouple, and of similar metals, such as copper, in the case of a resistance temperature device.

The portions of sensor wires 11,12 extending outwardly beyond the coterminous end faces 16,18 are cut to provide staggered lengths as shown in FIG. 1 and their end portions are bared as indicated at 11' for the wire detailed in FIG. 5. The stagger or longitudinal offset of the outer ends of cut wires 11,12 is about ¼ inch. The end portions of the corresponding lead wires 19,20 are bared as indicated at 19' for the wire 19 detailed in FIG. 5. The corresponding bared wire portions are overlapped about ⅛ inch and silver brazed at 21 to provide a joint as shown in FIG. 5. These silver brazed joints are carefully made to avoid sharp edges or protrusions that might pierce a heat shrink tubing 22 next to be applied.

A length of heat shrink tubing 22 of polyolefin material is slid over each joint 21 and butted tightly up against insulation end face 18, and then shrunk in place. The length of tubing 22 is sufficient to completely cover each joint and embrace portions of the wires on opposite sides of the joint. The right ends of heat shrink tubings 22 are substantially coplanar. Typically, tubing 22 is about 1¾ inches long when heat shrunk in position.

Thereafter, a plurality of cylindrical sealant bodies 23, preformed with a pair of spaced through holes 24 and 25, are threaded over wires 19 and 20. Lead wire 19 extends through aligned holes 24, and lead wire 20 extends through aligned holes 25. The first or leftmost body 23 butts up against the coplanar right ends of heat shrunk tubings or sleeves 22. Referring to FIG. 1, six such bodies 23 are shown threaded on lead wires 19,20 which extend outwardly beyond the outer or right end face of the rightmost body 23.

Sealant bodies 23 severally are made of any suitable thermoplastic material, preferably polysulfone. Since it is difficult to drill long holes in this material, relatively short individual sealant bodies are utilized and arranged in a string on the lead wires. Referring to FIG. 1, six sealant bodies 23 are shown each about 1 inch long and about 7/16 inch in diameter, having squared off ends abutting the ends of the adjacent bodies. Threading the six bodies 23 on lead wires 19,20 necessarily aligns their companion through holes 24 and 25 on these wires.

A metal termination tube 26, preferably made of stainless steel, is next slid over sensor 10 from left to right. Tube 26 includes a cylindrical left end section 28 of reduced diameter, a rightwardly enlarging tapered neck section 29, and a relatively long enlarged cylindrical right end section 30. Section 28 has an inside diameter only slightly larger than the outside diameter of sensor 10. Right end section is sized transversely to leave a small clearance 31 around bodies 23. If sensor 10 typically has an outside diameter of about ¼ inch, left end section 28 has an outside diameter of about ⅜ inch and an axial length of about 1 inch; intermediate tapered section 29 has an axial length of about 1½ inches; and right end section 30 has before swaging an ouside diameter of about ⅝ inch and an axial length of about 5¾ inches.

Termination tube 26 is positioned axially on the subassembly shown in FIG. 1 so that the inner end of left end section 28 is about transversely aligned with end faces 16,18, thereby overlapping casing 13 about 1 inch.

Tube 26 is then silver brazed continuously circumferentially to casing 13, as indicated at 32.

Following such brazing, the right end section 30 of the termination tube is swaged by passing the assembly shown in FIG. 2 leftwardly through the opening of a swaging die 33. This swaging operation reduces the diameter of right end section 30 so as to compress the sealant bodies 23 about lead wires 19,20. Typically, the cross sectional area of sealant bodies 23 before swaging is reduced from 10% to 28% after swaging, preferably about 17%. This provides an effective seal against moisture and gas axially along the interface between inner wall surface of section 30 and bodies 23, and along the interfaces between these bodies and lead wires 19,20. The various compressed sealant bodies are in effect unitized into a single body represented by the numeral 123 in FIG. 3. Thus, the sealant body 123 transversely fills or occupies the full cross sectional area of the swaged tube section 30, excluding, of course, the cross sectional areas occupied by the separated lead wires 19,20 which extend completely through this sealant body, whereby the outer end of this tube section is sealingly plugged while allowing the lead wires to extend outwardly therefrom.

During such swaging, the rightmost sealant body 23R is positioned to hold the other bodies 23 to its left tightly butted against each other and against heat shrunk tubing 22. At commencement of the swaging, body 23R projects from the right end of termination tube 26 about half its length or about ½ inch, as shown in FIG. 2. However, during swaging, the right end section 30 of tube 26 elongates, as do the sealant bodies 23 due to their radial compression, such that the body 23R is completely displaced from tube 26 and a portion of the next innermost sealant body is exposed as indicated at 23' in FIG. 3. Body 23R is then removed by sliding it rightwardly off the exposed portions of lead wires 19,20.

The completed assembly is illustrated in side elevation in FIG. 4 and provides a sealed temperature probe. It will be noted that the swaged termination tube, represented by the numeral 26', now serves as a tubular housing, sealed exteriorly at its left end to sensor casing 13 and sealed internally along its right end portion to lead wires 19,20. If desired, a length of heat shrink material can be placed over the exposed portions of lead wires 19,20 as they emerge from the sealant body 23', and for most of their length, as indicated at 34 in FIG. 4.

In use, the left closed or temperature sensing end 15 of the probe is positioned where desired to measure temperature. Casing 13 may be as long as desired. Housing 26', being exteriorly cylindrical, is adapted to be mounted on any suitable support (not shown) by suitable mounting means, not shown because forming no part of the present invention. Exemplary mounting means are shown in FIG. 7 of and described in U.S. Pat. No. 3,601,526.

From the foregoing, it will be seen that the preferred embodiment of temperature probe illustrated accomplishes all of the stated objects of the invention. Other variations and modifications in the illustrated temperature probe may occur to those skilled in the art without departing from the spirit of the invention, the scope of which is to be measured by the appended claims.

What is claimed is:

1. A temperature probe, comprising:
    temperature sensing means including a sensor having sensor wires, a metal casing and a body of mineral insulation surrounding said sensor wires and compressed thereagainst by said casing, said sensor wires extending outwardly beyond an end of said body;

means for sealing said end of said body of mineral insulation including a metal tubular housing, means for sealingly connecting said housing at one end to said casing, at least one body of sealant material transversely filling said housing at its other end and having an inner end spaced from said end of said mineral insulation body, and lead wires extending through said body of sealant material and therebeyond at both ends, said lead wires being in spaced relation to one another and to said housing, said body of sealant material being compressively sealed within said housing so as to compressively engage said lead wires;

and means within said space electrically joining said lead wires to said sensor wires.

2. A temperature probe according to claim 1 wherein said casing and said housing are each made of stainless steel, and said housing receives a portion of said casing and being brazed thereto.

3. A temperature probe according to claim 2 wherein said sealant material is compressible thermoplastic.

4. A temperature probe according to claim 3 wherein said lead wires are joined directly to said sensor wires.

5. A temperature probe according to claim 1 wherein said sealant material is compressible thermoplastic.

6. A temperature probe according to claim 1 wherein said lead wires are joined directly to said sensor wires.

* * * * *